March 24, 1959  E. R. SPEIR  2,878,945
FOLDING ADJUSTABLE SEAT TRAY ASSEMBLY
Filed March 16, 1956  2 Sheets-Sheet 1
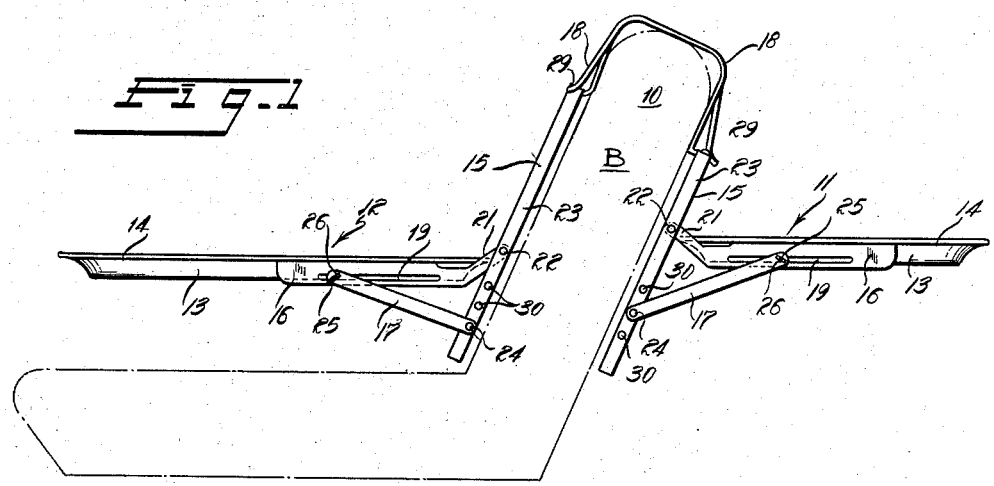
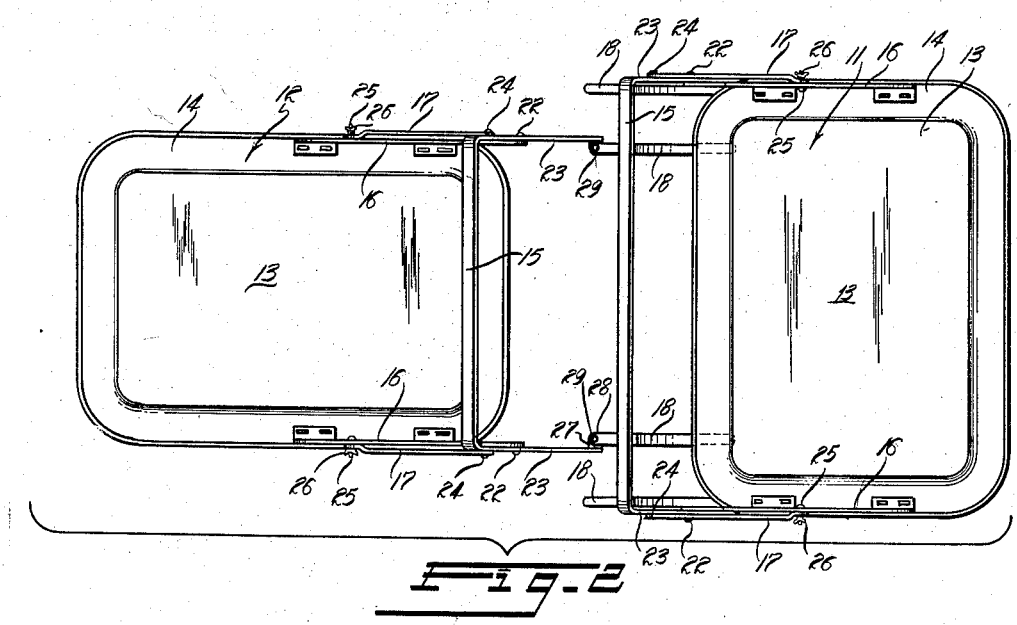
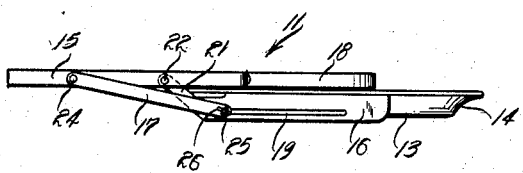
INVENTOR
CARL R. SPEIR
BY
Strauch, Nolan & Neale
ATTORNEYS March 24, 1959  E. R. SPEIR  2,878,945
FOLDING ADJUSTABLE SEAT TRAY ASSEMBLY
Filed March 16, 1956  2 Sheets-Sheet 2

INVENTOR
CARL R. SPEIR

BY
Strauch, Nolan & Neale
ATTORNEYS

United States Patent Office 2,878,945
Patented Mar. 24, 1959

2,878,945
FOLDING ADJUSTABLE SEAT TRAY ASSEMBLY
Earl R. Speir, Detroit, Mich.

Application March 16, 1956, Serial No. 572,014

7 Claims. (Cl. 211—88)

This invention relates to folding adjustable seat tray assemblies for automobiles and the like and particularly to tray assemblies that may be folded into flat compact units for storage but are quickly unfolded in condition for mounting on a car seat.

In its preferred embodiments the invention will be described as adapted for removable mounting on the usual front seat within an automobile sedan, for either front seat or rear seat use, as for eating within the car during rainy or cold weather, or mounting on the rear seat back also, if desired.

It is the major object of the invention to provide a novel adjustable automobile or like seat tray assembly which may be quickly removed and folded into a compact storage unit.

A further object of the invention is to provide a novel automobile seat tray structure that is adapted to be suspended from the upright back of the front or rear seats and can be adjusted to level the tray for front seat or rear seat passenger use.

It is a further object of the invention to provide a novel automobile seat tray structure wherein spaced hooks adapted to fit over the front or rear seat backs are swiveled for optimum positioning of the tray and for folding to flat condition during storage.

A further object of the invention is to provide a novel car seat tray assembly wherein the tray is adjustably pivoted to a skeletal frame the open ends of which carry swiveled seat back mounting hooks.

Further objects of the invention will appear as the description proceeds in connection with the annexed drawings wherein:

Figure 1 is a side elevation showing two seat trays of the invention as mounted for both front seat and rear seat passenger use;

Figure 2 is a bottom plan view of the trays of Figure 1 showing structural details;

Figure 6 is a fragmentary enlarged view showing the swiveled seat mounting hook arrangement.

Figure 3:
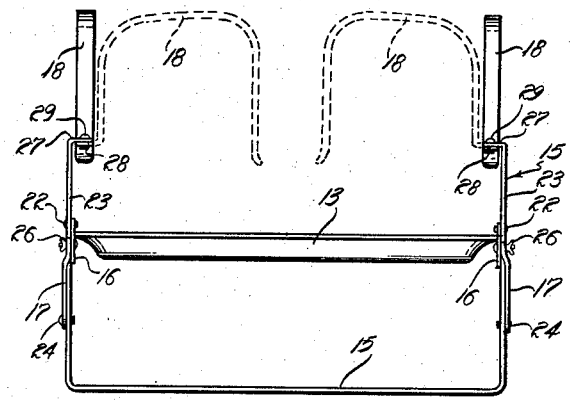
Figure 3 is a rear elevation of the rear seat passenger tray of Figure 1.

Referring to Figures 1 and 2, two tray assemblies are illustrated. Tray assembly 11 is mounted for rear seat passenger use, and tray assembly 12 is mounted for front seat passenger use. They may be interchanged but the arrangement wherein the long dimension of the tray extends at right angles to the seat back between the two front seat passengers is best for the front at 12.

The front seat tray assembly 12 will now be described in detail. Essentially it consists of a shallow rectangular metal tray 13 of the usual type having a peripheral rim 14 and a supporting and mounting structure comprising a rigid skeletal metal frame 15, two slotted tray side brackets 16 fixed to the tray, two adjustment levers 17 extending between the frame and the tray, and two seat back mounting hooks 18 swiveled on the open ends of the frame. The illustrated skeletal frame is of U-shape but equivalent structures such as H or X shapes may be used. In each of the assemblies 11 and 12 the same numerals are used to indicate similar parts, the difference between the two as illustrated being only in the location of brackets 16 and the corresponding dimensions of the associated parts.

Brackets 16 are rigid parallel metal plates secured to depend from the underside of rim 14 as by rivets or welding. This front seat passenger tray mounts these brackets along the long sides of the rectangle for convenience, although it will be understood that they could be mounted along the short sides as in assembly 11 if the tray is to be disposed with its long side along the seat. The brackets 16 have parallel coextensive slots 19 and at their rear ends are formed with similar upwardly angled portions 21 that extend past the top edges of the tray 13 and are pivoted at 22 to the opposite parallel side arms 23 of frame 15.

Below pivots 22, the levers 17 are pivoted at one end at 24 to frame side arms 23 and have their other ends slidably pivotally mounted in slots 19 as by a slidable pivot pin or bolt 25 having a releasable nut 26 which when tightened locks lever 17 to the tray in a desired position of adjustment.

At their upper open ends the frame side arms 23 are bent inwardly to form flat tabs 27 and corresponding outwardly bent flat tabs 28 on hooks 18 fit underneath, the tabs 27 and 28 being swivelly connected by pivot pins 29. The hooks 18 are coated or covered with rubber, plastic or like soft friction material so as not to mar the seat back fabric but to grip even slippery seat covers.

The pivot axes at 22, 24 and 25 are parallel and perpendicular to the pivot axes at 29.

Figure 1 shows tray assembly 12 mounted on the back of the usual car front seat, being suspended by hooks 18 which are of such size as to fit over the top of the standard size seat backs 10 and are sufficiently laterally spaced to provide stable support. In this instance, with nuts 26 loose, the frame 15 is swung on fixed pivots 22 until it is approximately parallel to the inclination of the seat back and hooks 18 are mounted over the top of seat back B. Then the tray is adjusted to horizontal position as permitted by the oppositely pivoted ends of levers 17. Then nuts 26 are tightened and this locks the tray in adjusted position on the frame 15.

The swiveled mounting of hooks 18 permits any slight lateral alignment needed to follow the seat back contour or to fit over the backs of two door sedan separate seats that may not be exactly at the same inclination. The entire tray assembly 12 may effectively swing about the hooked suspension support on the seat backs as a pivot until frame 15 contacts the seat back if loaded sufficiently, but ordinarily with normal loads on a horizontal tray, the frame 15 is slightly spaced from contact with the seat back as illustrated in Figure 1 and the whole load may be borne by the hooks 18.

With tray assembly 12 so adjusted and in the operative position of Figure 1, it effectively interfits with the inclined seat back and the levers 17 brace the tray on the frame as well as acting to maintain the entire assembly in operative extended condition. The dimensions of the parts and the location of pivots 22 are such that the tray in its operative position extends straight out horizontally from the seat back between the front seat passengers. It will be observed that pivots 22 are located just above and rearwardly of the tray in extended position of the frame. Also spare apertures 30 may be provided in frame arms 23 for optional mounting of pivots 24 to suit different seat backs and conditions of adjustment. The mounting of tray assembly 11 on the back of the front seat, or the mounting of either tray assembly 11 or 12 on the back of the rear seat, are similar.

Figure 4:
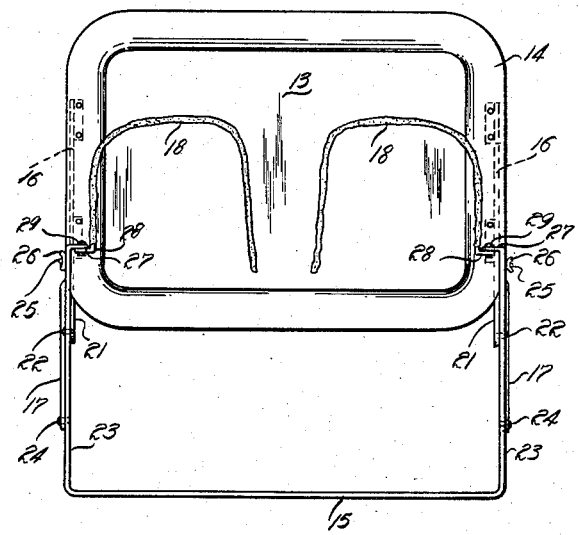
Figure 4 is a top view of the folded tray of Figure 3.
Figure 5:
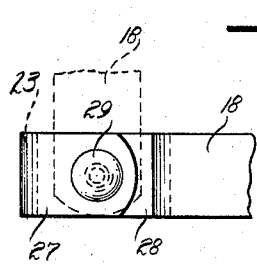
Figure 5 is a side elevation of the folded tray of Figure 4.

Figures 4 and 5 show the tray assembly 11 in folded condition. The tray assembly 12 folds similarly. The nuts 26 are loosened and frame 15 is swung clockwise from its Figure 1 condition until it is substantially parallel to the tray 13 as shown in Figure 5 with each pivot pin 25 sliding to the rear of slot 19 where it may be tightened to lock the folded assembly. The hooks 18 are oppositely swung inwardly into the tray where as shown in Figure 4 they overlie substantially parallel to the tray bottom. The pivot connection at 29 is such that the hooks 18 can swing inwardly only and are in any event limited to 180° movement and are stopped by abutment with frame arms 23 from swinging outward beyond their operative position of Figure 1.

The tray assembly 11 shown in the rear seat passenger serving position of Figure 1 is, except for relative dimensions, of the same construction as tray assembly 12. In this tray assembly the rigid plate brackets 16 are secured upon the short sides of the tray 13, and the other parts including the U-shaped frame 15, levers 17 and hooks 18 are connected as in assembly 12, and the parts corresponding to assembly 12 are identified by the same reference numerals in assembly 11.

It will be observed from Figure 1 that for rear seat passenger use the frame 15 is swung to assume a position where it is about parallel to the rear surface of the seat back and then horizontally adjusted and fixed so that the tray extends rearwardly. Either of the tray assemblies 11 or 12 can be hooked over the back of the rear seat to dispose the tray between and accommodate the people in the rear seat only.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a seat tray assembly adapted for mounting upon a car seat or the like, a rigid frame, a tray pivoted to said frame intermediate the upper and lower ends of said frame, hook means swiveled on the upper end of said frame for suspending the assembly from the back of said car seat whereby said hook means may be swung laterally inwardly to overlie said tray substantially parallel and adjacent to the bottom thereof when the assembly is not mounted on said seat back, and cooperating means on the frame and tray for adjusting the tray to a normally level position when the frame is suspended on the car seat and locking the adjustment comprising a pair of angularly adjustable links pivotally connected to said frame below the pivot axis of the tray on the frame and slidably pivotally connected to opposite sides of the tray and manually operable means for releasing and tightening said slide pivot connection.

2. In an adjustable foldable car seat tray assembly, a rigid frame, a tray pivoted near one end on said frame, two adjustment levers pivoted at opposite ends to corresponding opposite sides of said frame and said tray, one of each pair of said lever pivot connections being slidable to permit folding together of the tray and frame, manually releasable means for loosening or tightening said slidable pivot connections, and spaced suspension hooks separately pivoted to the upper end of the frame on axes normal to the tray pivot axis on the frame so that said hooks may be swung laterally inwardly to overlie the tray in the folded assembly, said levers being pivotally connected to said frame below the axis of the pivotal connection of the frame to the tray.

3. In the assembly defined in claim 2, each of said levers having a fixed pivot connection to the frame below the tray pivot, and each of said levers having a pin and slot slide pivot connection with said tray, and said manually releasable means comprising means for locking said pin and slot connections in either extended or folded conditions of the assembly.

4. In a foldable and adjustable car seat tray assembly, a generally skeletal rigid frame having upright laterally spaced side arms, a tray, parallel side brackets rigid with said tray each having an upwardly inclined end portion at one end of the tray, aligned pivotal connections between said frame side arms and said bracket extensions, levers pivoted at one end on said frame side arms below the tray pivots and having their other ends slidably pivotally connected to said brackets, releasable lock means at said slide pivot connections for maintaining relative adjustment between the tray and frame, and suspension hooks swiveled on parallel upright axes upon the upper ends of said arms, said tray and frame being foldable into substantially parallel relation to be maintained by said lock means and said hooks being foldable to overlie the tray whereby a compact storable unit may be provided when the assembly is not mounted on the seat back.

5. In an adjustable foldable assembly for mounting a tray upon a car seat or the like, a rigid upright frame, tray support means pivoted to said frame intermediate the upper and lower ends of said frame, means pivotally swiveled on the upper end of said frame for suspending the assembly from said car seat or the like and whereby said means is turned laterally inwardly in overlapping relation to the bottom of said tray when the assembly is folded, and cooperating means on said frame and tray supporting means for adjusting said tray supporting means to a normally level position and maintaining the adjustment comprising a parallel pair of angularly adjustable levers pivotally connected to said frame on aligned axes below the pivot axis of the tray supporting means on the frame and slidably pivotally connected to said tray supporting means at opposite sides thereof, and manually operable means for releasing and tightening said slide pivot connection.

6. In a foldable and adjustable assembly for supporting a car seat tray, a generally skeletal rigid frame having upright laterally spaced side arms, tray mounting means comprising parallel side members pivoted on the frame side arms on aligned axes, parallel levers mounted on aligned pivots on the frame side arms below said side member pivots, means providing slide pivot connections between each of said levers and one of said side members, means for releasably locking said slide pivot connections for selectively adjusting and maintaining a level position of a tray mounted on said side members, means on the frame above said pivot axes for suspending the assembly from a car seat back or the like, means providing swivel pivot connections between said suspending means and said frame whereby said slidable pivot connections permit said tray and said frame to fold together and said swivel pivot connections permit said suspending means to be turned laterally inwardly in overlapping relation to the bottom of said tray.

7. In the assembly defined in claim 6, said frame being substantially U-shaped and said last-named means being hooks swiveled on the upper open end of the frame.

References Cited in the file of this patent
UNITED STATES PATENTS

| | | |
|---|---|---|
| 1,593,835 | McNeal et al. | July 27, 1926 |
| 1,641,358 | Smyser | Sept. 6, 1927 |
| 2,173,569 | Proendle | Sept. 19, 1939 |
| 2,556,724 | Hubsch | June 12, 1951 |
| 2,584,006 | Finger | Jan. 29, 1952 |
| 2,640,597 | Thomson | June 2, 1953 |
| 2,693,400 | Erickson | Nov. 2, 1954 |
| 2,749,430 | Cohn | June 3, 1956 |

FOREIGN PATENTS

| | | |
|---|---|---|
| 593,204 | Great Britain | Oct. 10, 1947 |